United States Patent [19]

Buhl et al.

[11] Patent Number: 5,808,194
[45] Date of Patent: Sep. 15, 1998

[54] FLOW MONITORING PROCESS

[75] Inventors: Peter Buhl, Weingarten; Jörg Schütze, Wasserburg, both of Germany

[73] Assignee: i f m electronic GmbH, Germany

[21] Appl. No.: 396,222

[22] Filed: Feb. 28, 1995

[30] Foreign Application Priority Data

Feb. 28, 1994 [DE] Germany ............... 44 06 541.8

[51] Int. Cl.⁶ .................................................. G01F 1/68
[52] U.S. Cl. ........................................................ 73/204.11
[58] Field of Search ....................... 73/204.11; 340/588; 200/61.45 R

[56] References Cited

U.S. PATENT DOCUMENTS

| 3,196,679 | 7/1965 | Howland ....................... 73/204.11 |
| 3,366,942 | 1/1968 | Deane ........................... 73/204.11 |
| 3,570,310 | 3/1971 | Densmore ...................... 73/204.11 |
| 4,655,041 | 4/1987 | Del Vecchio et al. .............. 60/646 |
| 4,770,037 | 9/1988 | Noir et al. ..................... 73/201.11 |
| 5,172,096 | 12/1992 | Tice et al. ..................... 340/501 |

FOREIGN PATENT DOCUMENTS

| 2447617 | 4/1976 | Germany . |
| 2629051 | 1/1978 | Germany . |
| 3222046 | 12/1983 | Germany . |
| 3309404 | 9/1984 | Germany . |
| 36 38 137 A1 | 11/1986 | Germany . |
| 37 24 86 A1 | 7/1987 | Germany . |
| 3713981 | 11/1988 | Germany . |
| 39 14 216 | 4/1989 | Germany . |
| 3825059 | 8/1989 | Germany . |
| 3911008 | 5/1990 | Germany . |
| 3943437 | 10/1990 | Germany . |
| 3900284 | 12/1990 | Germany . |

*Primary Examiner*—Richard Chilcot
*Assistant Examiner*—Jewel Artis
*Attorney, Agent, or Firm*—Sixbey, Friedman, Leedom & Ferguson, P.C.; David S. Safran

[57] ABSTRACT

A process for monitoring the flow of flowing media, especially for acquiring the heat transport capacity of the flowing medium, in which a measurement signal of a temperature measurement element influenced by at least one heating element and the medium flowing past it is monitored and in which an output signal is generated when the measurement signal of the temperature measurement element exceeds or falls below a switching point. A reduction of the reaction time of the process for monitoring the flow of flowing media is guaranteed by the heat output of the heating element and/or the location of the switching point changing as a function of the output signal.

18 Claims, 9 Drawing Sheets

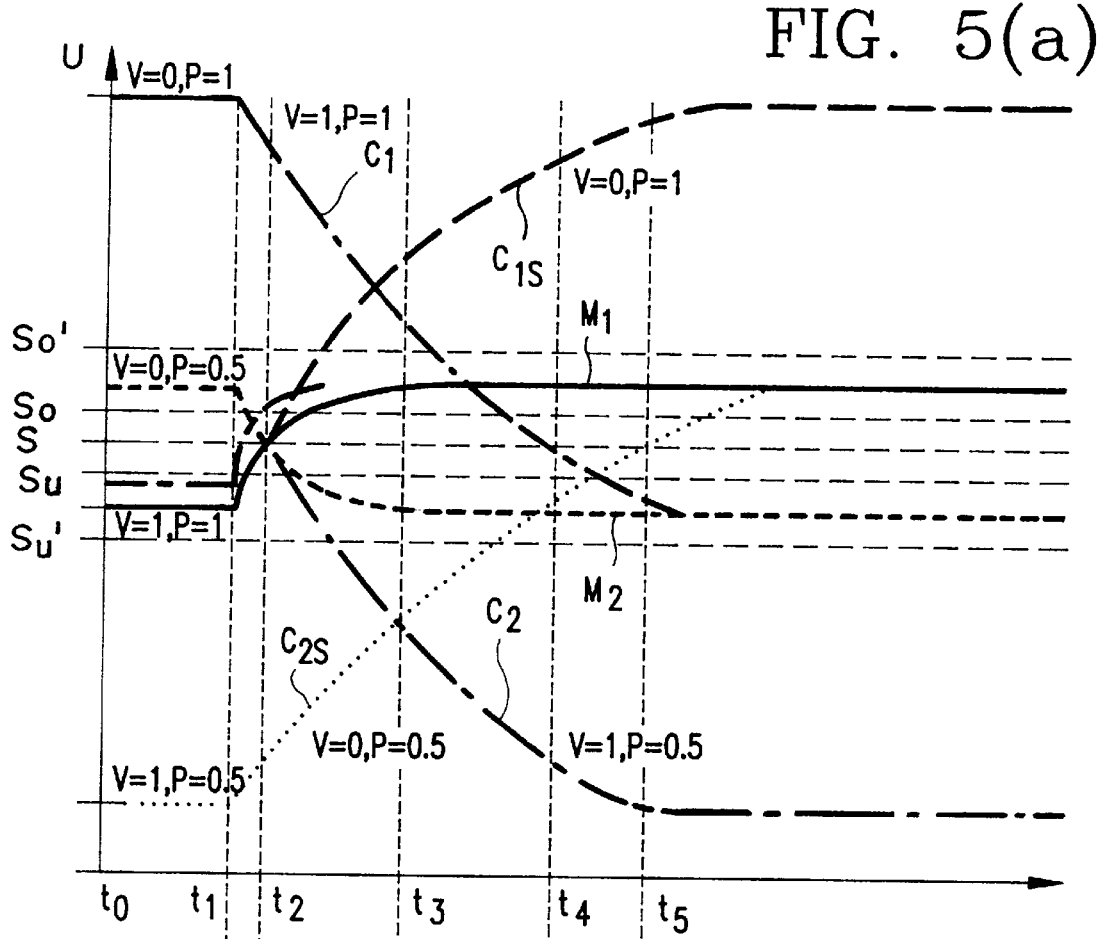
FIG. 5(a)
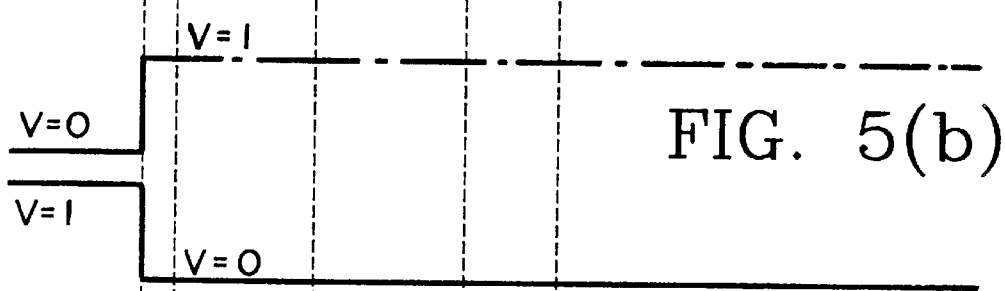
FIG. 5(b)
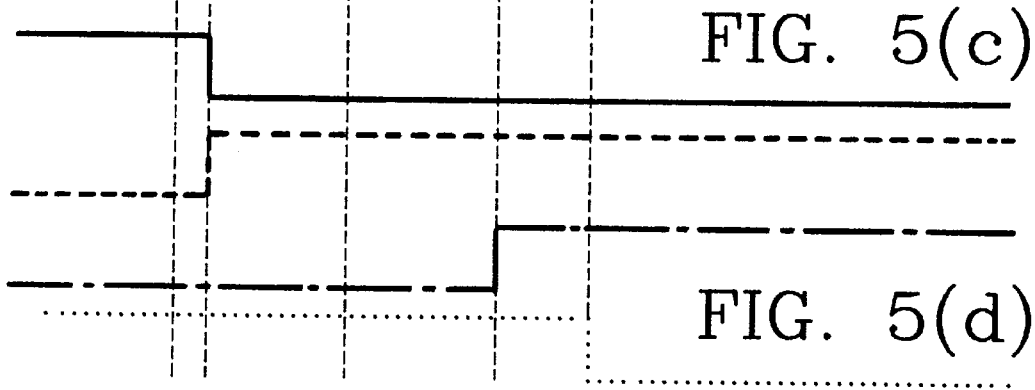
FIG. 5(c)
FIG. 5(d)

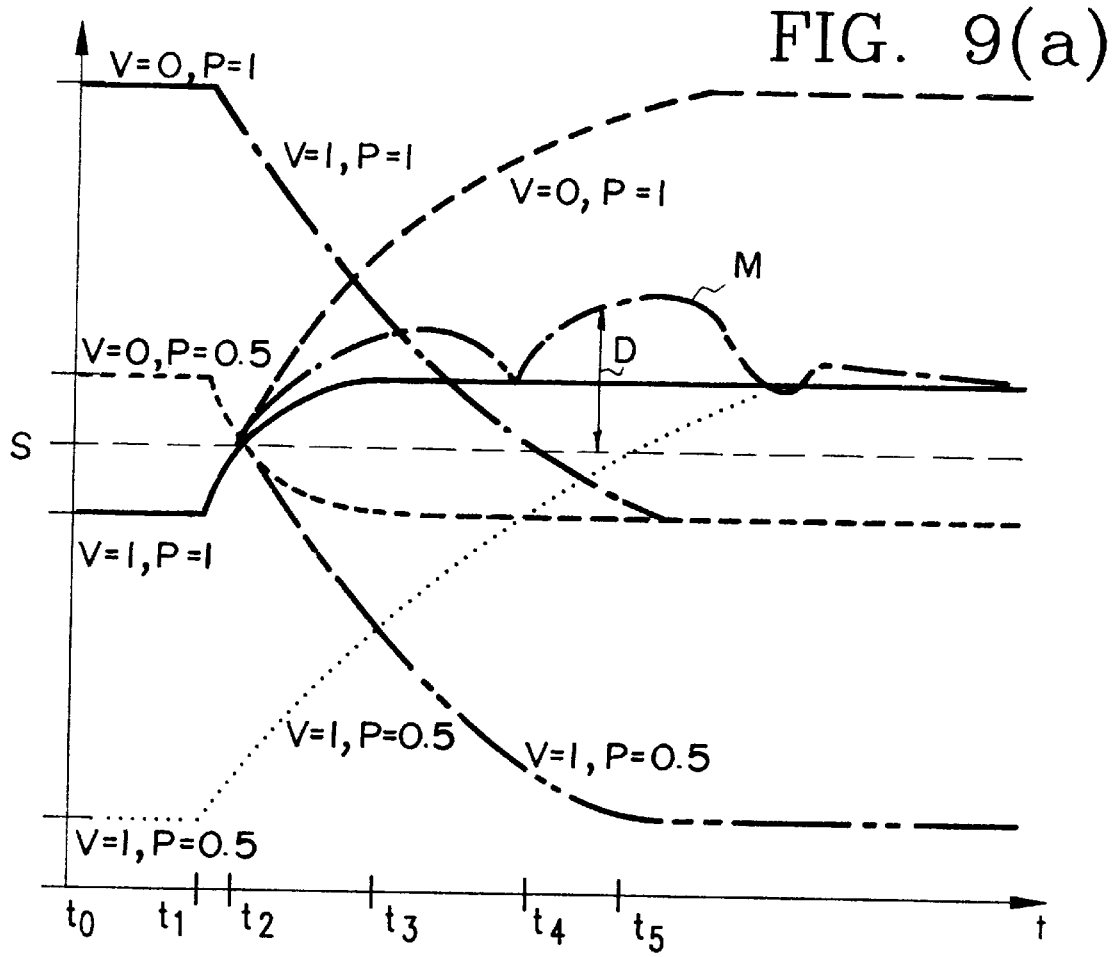
FIG. 9(a)
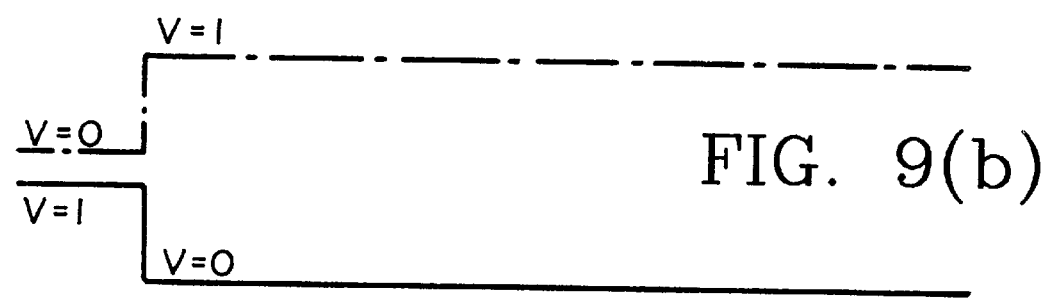
FIG. 9(b)
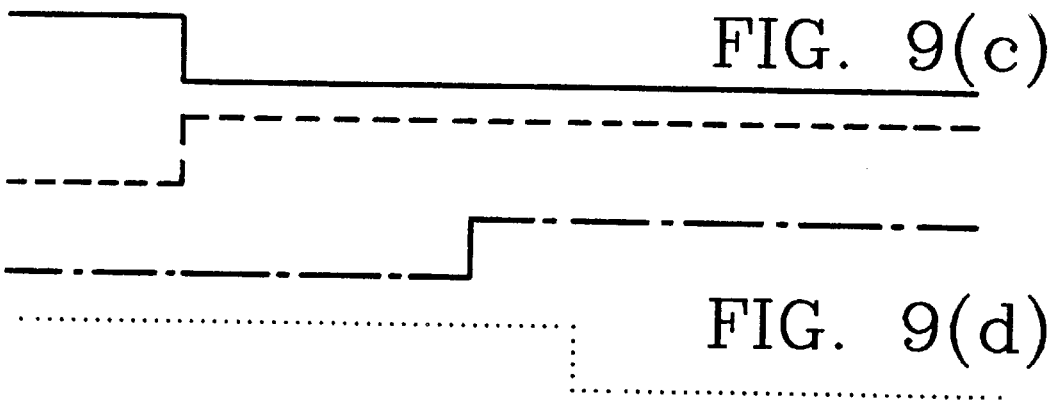
FIG. 9(c)
FIG. 9(d)

FLOW MONITORING PROCESS

BACKGROUND OF THE INVENTION

1. Field of the Invention

The invention relates to a process for monitoring the flow of a flowing media, especially for acquiring the heat transport capacity of the flowing medium, in which a measurement signal of a temperature measurement element which is influenced by at least one heating element and the medium flowing past is monitored, and in which an output signal is generated when the measurement signal of the temperature measurement element exceeds or falls below a switching point.

2. Description of Related Art

Flow measuring instruments of the type to which the present invention is directed, especially calorimetrically operating flow indicators, have been known for a long time and in many versions (compare, for example, German published patent application nos. 24 47 617, 26 29 051, 32 13 902, 32 22 046, 37 13 981, 38 11 728, 38 25 059, 39 11 008, and 39 43 437). In these flow measuring instruments, hereinafter called flow indicators, differential temperature measurement is generally used. A first temperature measuring element measures a temperature determined by a heating element and by the flowing medium, this temperature reflecting the heat output of the heating element and the flow-dependent heat transport capacity of the flowing medium. Furthermore a second temperature measurement element measures a reference temperature which is influenced as much as possible, not by the heating element, but by the flowing medium. For the subject matter of this invention, the reference temperature measurement is not absolutely necessary. It can be omitted, for example, when the temperature of the flowing medium is known. In particular, flow indicators are also known which are generally called "dynamically" operating flow indicators. In these flow indicators the heating element is heated only during periodically recurring time intervals. The flow of the flowing medium is monitored in the dynamically operating flow indicators by evaluating the time variation of the measurement signal of the temperature measurement element in the time intervals in which the heating element is not activated.

Flow indicators using the calorimetric principle are used in the most varied areas of flow monitoring as the result of their durable, reliable and problem-free properties. One preferred application of these flow indicators is, for example, use in machine tools in which lubricant/coolant monitoring must be ensured. In these applications, the states of "flow stoppage" and "flow present" are distinguished. In particular, the respective transient response when switching between these two states is of interest here. The behavior of the output signal of the flow indicator during switching is decisive, as will be clear below, for the operating safety of a machine tool, for example.

The operating speeds of machine tools are in part so great that the lack of a lubricant/coolant film for more than 1 to 2 seconds can lead to destruction of the tool (metal fire). This means that the flow indicators must have a correspondingly short reaction time in case of flow failure or flow reduction. For this reason, in known flow indicators the switching point is at rather low temperatures. A corresponding location of this switching point is shown in FIG. 1. At this position of the switching point, which is geared to a short reaction time for flow failure, it is especially problematical that it is not possible to monitor actual flow stoppage since the switching point is very near the overall nominal flow. Even a small flow drop by roughly 20% results in the value falling below the switching point; this, in turn, means that the flow indicator delivers a "flow stoppage" output signal at a flow of up to 80% of the nominal flow.

For the rest, another task of the flow indicator during use, for example, in machine tools, is to detect flow as quickly as possible. The clamped work can only be machined when the flow indicator has detected the presence of the coolant/lubricant. To save valuable machining time here, this flow should of course be detected as quickly as possible. Known from the prior art, a location of the switching point near the measurement signal for actual flow stoppage is selected for this purposes. This is shown in FIG. 2. It is now immediately recognized that this setting to a short reaction time as flow begins contradicts monitoring of the nominal flow with a likewise short reaction time, since the switching points to be selected in each case are highly divergent. In the location of the switching point near flow stoppage which was described last, a small flow rise by roughly 20% leads to the switching point being exceeded, i.e., the flow indicator reports a flow of 20% of the nominal flow as "flow present".

SUMMARY OF THE INVENTION

The primary object of the present invention is to configure and develop a process the above-described types so as to ensure a short reaction time both in the monitoring of the nominal flow and also in the monitoring of flow stoppage.

The process according to the invention in which the aforementioned object is achieved is, first of all, essentially characterized in that the heat output of the heating element and/or the location of the switching point are changed as a function of the output signal. In particular, for the case of a relatively high temperature on the temperature measurement element, which represents a "flow stoppage" output signal, the heat output is reduced and/or the location of the switching point is changed to higher values and for the case of a relatively low temperature on the temperature measurement element, which is representative of a "flow present" output signal, the heat output is raised and/or the location of the switching point is changed to lower temperatures. Thus, in the presence of flow, in the area of the nominal flow, it is ensured that the measurement signal as a result of the increased heat output and/or the location of the switching point at lower values is in the vicinity of the switching point. When flow drops, as a result of the rise in the temperature on the temperature measurement element the switching point is immediately exceeded and the output signal "flow stoppage" is delivered. Simultaneously, with delivery of the output signal "flow stoppage" the heat output of the heating element is removed and/or the location of the switching point is changed to higher values; this results in the measurement signal being in the vicinity of the switching point. This, in turn ensures, that flow stoppage is monitored with a small response time. The measures and advantages described here do not relate only to "statically" operating flow indicators, but they can also be applied to dynamically operating flow indicators.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIGS. 5a–d show measurement signals, flow, and the output signal of the process of the present invention and the output signal of a known process;

FIGS. 9a–d correspond to FIGS. 5a–d but are of a second embodiment of the process according to the invention and the output signal of a known process.

DETAILED DESCRIPTION OF THE PREFERRED EMBODIMENTS

Figure 3:
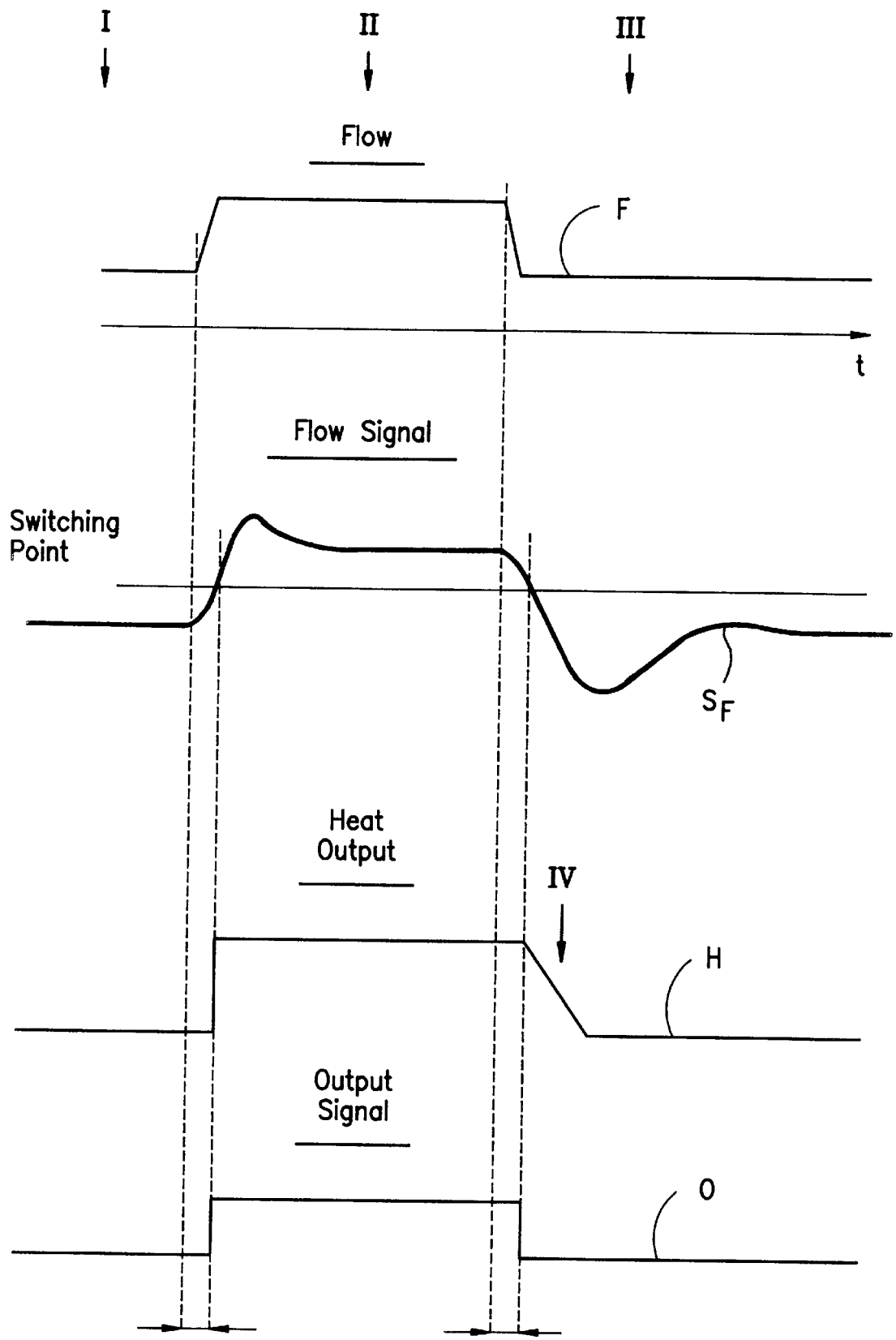
FIG. 3 shows the flow, flow signal, heat output and output signal of a first embodiment of the process according to the invention.

FIG. 3 shows, for a first embodiment of the process according to the invention, the time behavior of the flow signal S which reflects the temperature at a temperature measurement element which is influenced by at least one heating element and the flow F of a medium flowing past it, the heat output H of the heating element and the output signal O which reproduces the flow state of the flowing medium as a function of a time-variable flow.

In area I no flow occurs, i.e., the output signal "flow stoppage" is delivered and the heat output of the heating element is at a reduced level. If, at this point, the flow rises into the area of the nominal flow, represented by area II, the output signal "flow present" is delivered with a short reaction time, and at the same time, the heat output of the heating element is increased, so that the flow signal is kept in the area of the switching point, by which, as already explained, a high reaction speed is ensured. If, now, the flow decreases again and thus enters the area of flow stoppage, represented by area III, the output signal "flow stoppage" is obtained with a short reaction time. Accordingly, the heat output of the heating element is now reduced again.

In the first embodiment of the process according to the invention shown in FIG. 3, there is the danger of the process leading to oscillation of the output signal in natural resonance due to switching on and off of the heat output. One first possibility for avoiding this problem is to change the heat output of the heating element with a predetermined delay after the output signal changes. This possibility is not shown in the drawing.

In the first embodiment shown in FIG. 3, the heat output of the heating element in area IV is continuously reduced to prevent the process leading to oscillation of the output signal in natural resonance. The change of the heat output in the transition from the "flow stoppage" state into the "flow present" state can conversely take place intermittently since the thermal inertia is enough here to prevent natural resonance. However, for this case, a continuous increase of the heat output, for example, during major relative changes of the heat output and at low speeds of flow change, can also reduce the tendency toward natural resonance.

Figure 4:
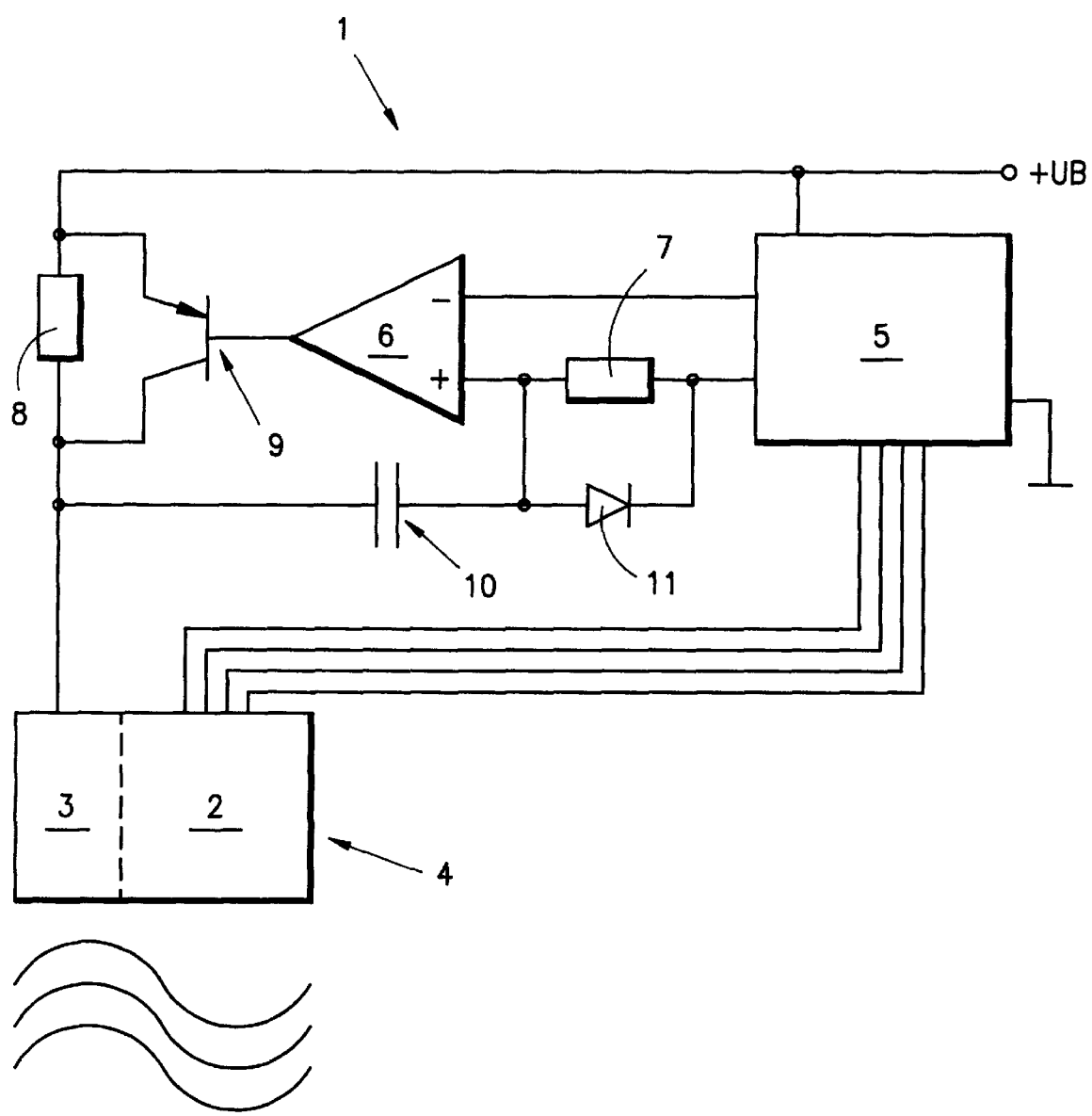
FIG. 4 shows an embodiment of a circuit for implementing a process according to the invention.

FIG. 4 shows a circuit for executing the first embodiment of the process according to the invention. In circuit 1, temperature measurement element 2 and heating element 3 are formed as single unit 4. This unit 4 is connected via a measurement output to a signal evaluation and display unit 5 which is powered by supply voltage UB. Signal evaluation and display unit 5 is directly connected to the inverting input of operational amplifier 6 and via first resistance 7 to the noninverting input of operational amplifier 6. The output of operational amplifier 6 controls transistor 9 located parallel to second resistance 8, with the emitter being connected to the positive pole of power supply voltage UB. The collector of transistor 9 and the second resistance, are on the one hand, connected to heating element 3, and on the other, via capacitor 10 to the noninverting input of the operational amplifier 6. Moreover, a diode 11, which is connected by its anode to capacitor 10, is connected in parallel to first the resistance 7.

The first embodiment of the process according to the invention shown in FIG. 3 is shown in FIG. 5 in comparison to a known process in another view. In FIG. 5a, the measurement signals of different processes with the alternative flows shown in FIG. 5b are shown as a function of time. Here, it should be noted that a measurement signal shown in FIG. 5a differs from the flow signal S as shown in FIG. 3 only by the sign.

Figure 1:
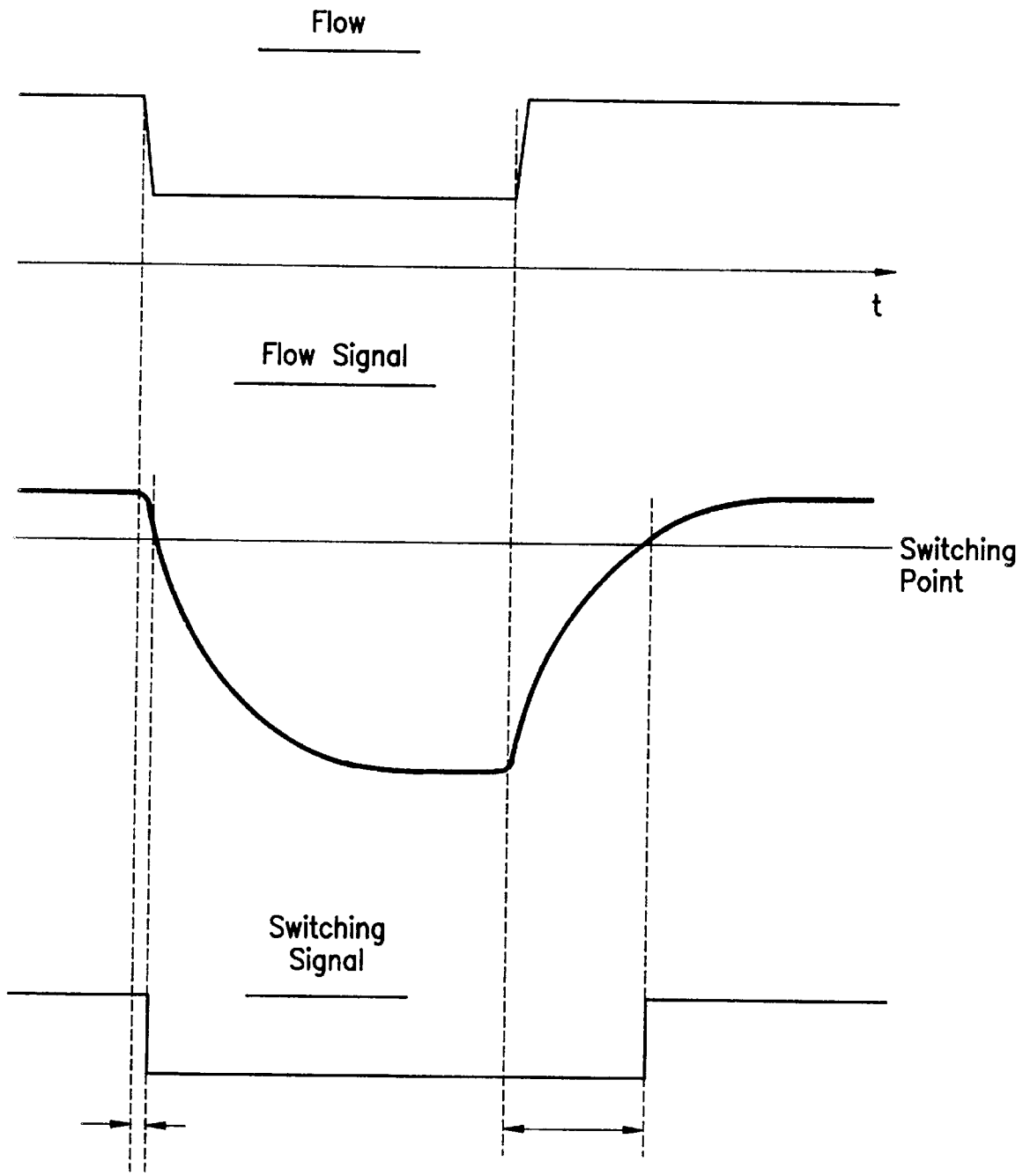
FIGS. 1 & 2 show the flow, flow signal, and output signal of conventional systems.
Figure 2:
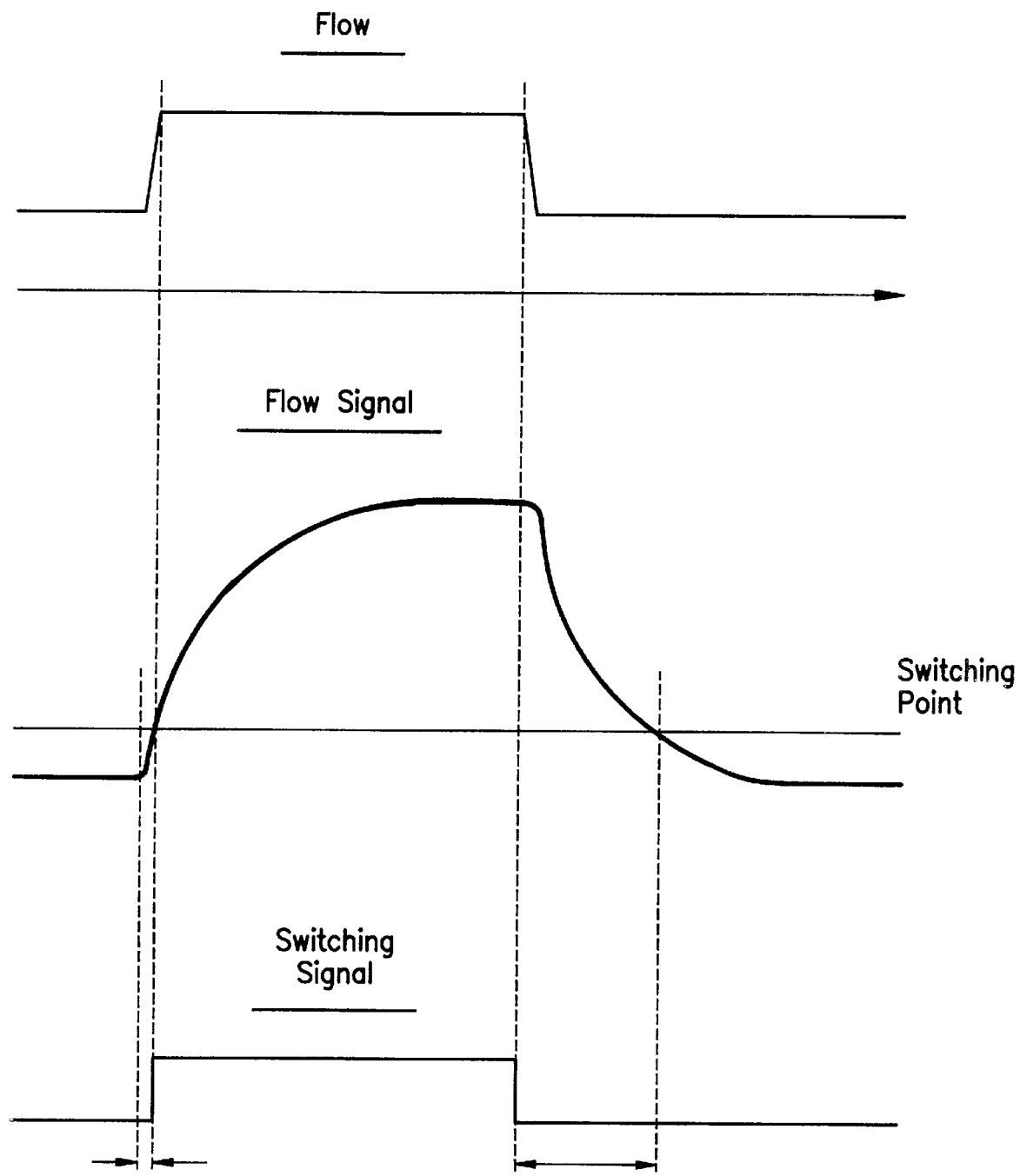

First, the case shown by the upper, dot-dash line in FIG. 5b, in which the flow rises from flow stoppage at time $t_1$ to the nominal flow of flow velocity V=1, will be examined. For a first known process, FIG. 5a shows the corresponding measurement signal behavior by a double dash-dot line $C_1$. It is apparent that this double dash-dot line falls below switching point s only at a relatively late time $t_4$. Thus, as shown by the dot-dash line in FIG. 5d, a great time delay occurs before an "flow present" output signal is delivered. In a second known process, with the measurement signal represented by the dash-double dot line $C_2$, as explained already using FIG. 1, a clearly lower reaction time is achieved.

If, at this point, we further examine the case shown by the lower, solid line in FIG. 5b, in which the flow at time $t_1$ drops from the nominal flow to flow stoppage, V=0, the long-dash line $C_{1s}$ in FIG. 5a describes the measurement signal of the first known process. Here, it is recognized that, in this case, the first known process has a short reaction time. Conversely, it can be read on the measurement signal of the second measurement process shown in FIG. 5a by very short dashes $C_{2s}$, that it delivers a "flow stoppage" output signal only with a clear delay, at time $t_5$. The first embodiment of the process according to the invention, conversely, as shown in FIG. 5a, using the measurement signals $M_1$ and $M_2$ shown by the broken and the solid lines, delivers a corresponding output signal, as shown by the same line types in FIG. 5c, with very short reaction times at time $t_2$ for both a flow rise and also a flow drop. The reaction time for a flow drop, as shown using the measurement signal represented by dots and dashes in FIG. 5a, can be further lowered by increasing the heat output for output signal "flow present". This increase of heat output presents no problems since, as the result of the drop in the heat output when the switching point is not reached, overheating of the heating element cannot occur.

The necessity of essentially continuously changing the heat output in the first embodiment of the process according to the invention is further illustrated using FIG. 6. Linear signal variations are assumed in FIG. 6 for the sake of better clarity.

Figure 6A:
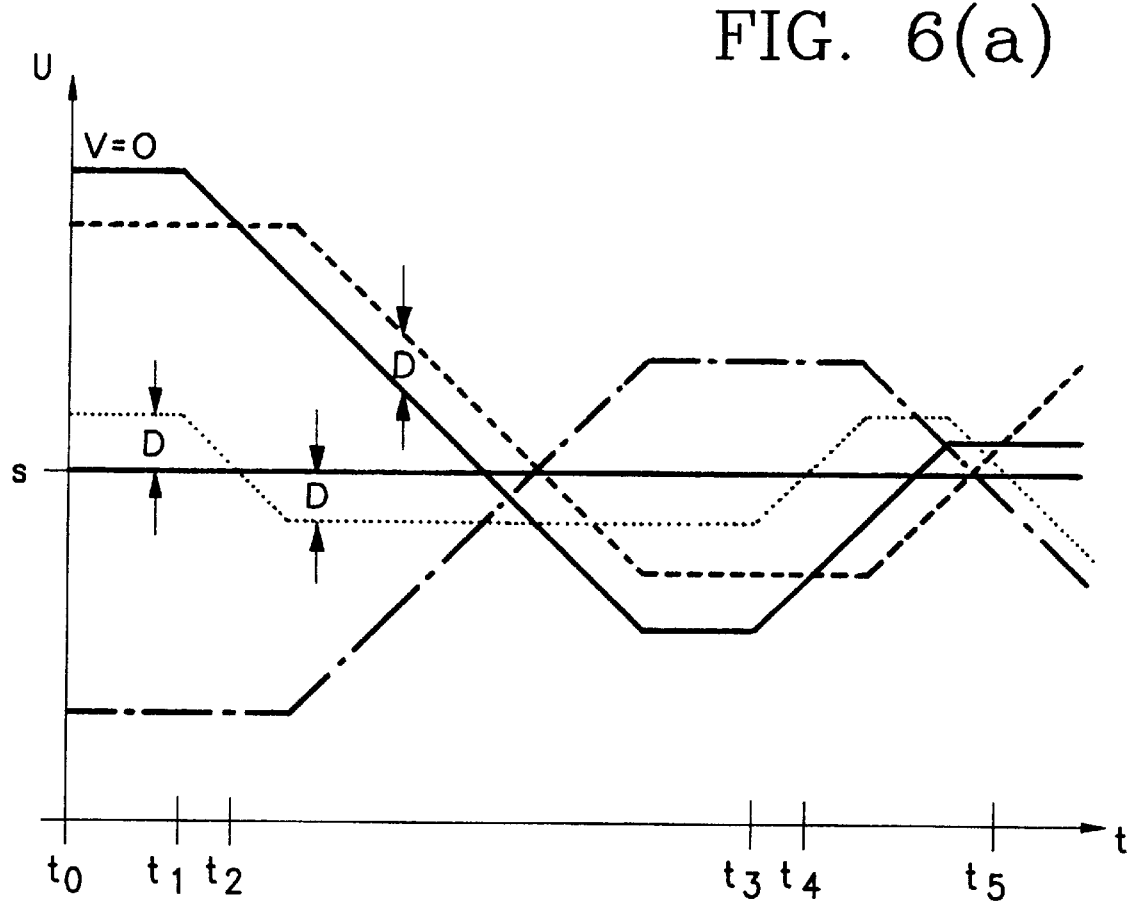
FIGS. 6a–c show the different portions of the measurement signal of the process according to the invention, flow and the output signal of the first embodiment of the process according to the invention.
Figure 6B:
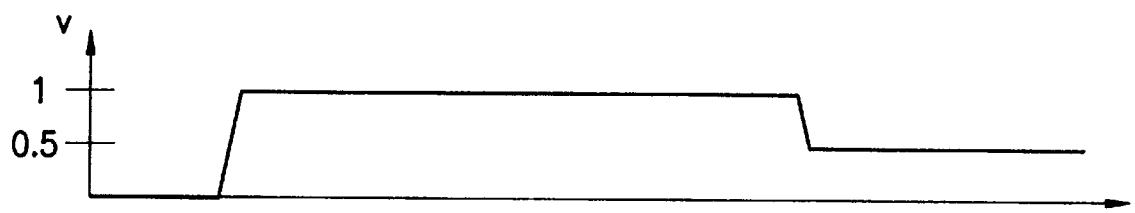
Figure 6C:
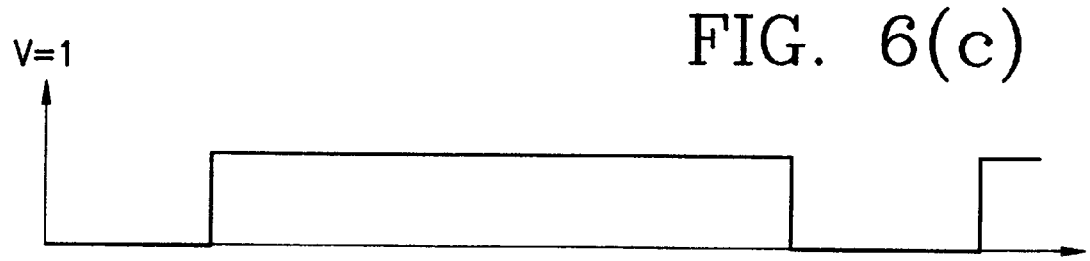

In FIG. 6, the dot-dash line shows the case in which the flow velocity is constant, and beginning at time $t_2$, the heat output is changed. On the other hand, the solid line shows the change of the measurement signal when the heat output remains constant and the flow velocity at time $t_1$ changes. For the sake of better clarity, the dot-dash line at switching point S is shown reflected as a broken line. The difference of values of the solid line and broken line yields the resulting, here very short-dashed line, which in the interest of fast reaction times should be as close as possible to switching point s, i.e., distance D between the measurement signal shown as a very short-dashed line and switching point s should be as small as possible. If the very short-dashed line falls below switching point s at time $t_2$, by means of corresponding time control, for example, a delay of the heat output change or a ramp-like heat output change, the very short-dashed line must be prevented from again exceeding switching point S in the opposite direction so that oscillation of the output signal occurs. As shown in FIGS. 6a through 6c, this undesirable oscillation of the output signal can occur even with a time delay of the change of the heat output or a ramp-like change of the heat output when the flow, as shown in FIG. 6b, temporarily assumes a value between the nominal flow and flow stoppage values.

Figure 7:
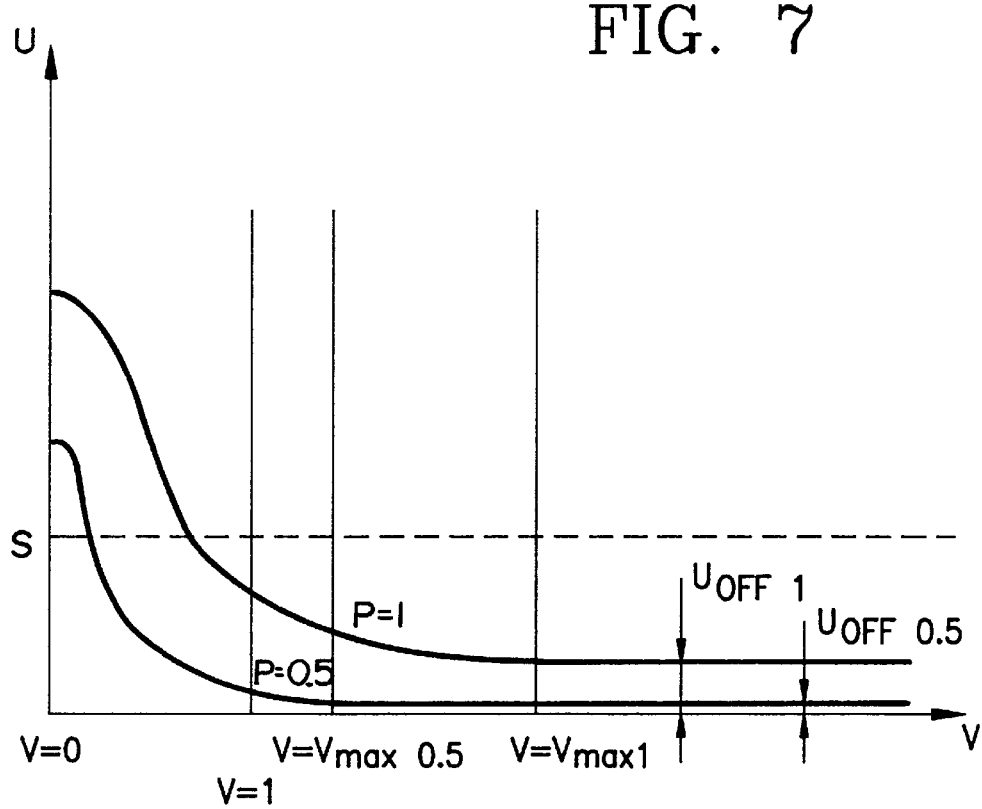
FIG. 7 shows the relationship between the measurement signal and the flow speed and temperature of the heating element.

To explain in greater detail the circumstances which can lead to an undesirable oscillation of the output signal, the relationship between the measurement signal, the flow velocity and the temperature of the heating element will be examined, first of all, using FIG. 7. FIG. 7 shows the relationship of the measurement signal and flow velocity for two heat outputs P=1 and P=0.5. In real flow indicators, these heat outputs are in the range from roughly 100 to 1000 mW. It is clearly recognizable in FIG. 7 that the curve of the measurement signal runs on an overall higher level at higher heat output. The higher level of the measurement signal at the higher heat output and a flow at the level of the nominal flow is decisive for the increase of the reaction speed when the output signal is output. This higher level is composed of the greater offsets $U_{Off1}$ at heat output P=1 compared to offsets $U_{Off0.5}$ at a heat output of P=0.5 at flow velocities above the so-called threshold flow velocities $V_{max}$, on the one hand, and on the other hand, the threshold flow velocity at lower heat output P=0.5, $V_{max0.5}$, is only barely above the velocity of the nominal flow, represented by the horizontal axis, while the threshold flow velocity at higher heat output P=1, $V_{max1}$, is clearly above the velocity of the nominal flow.

Figure 8:
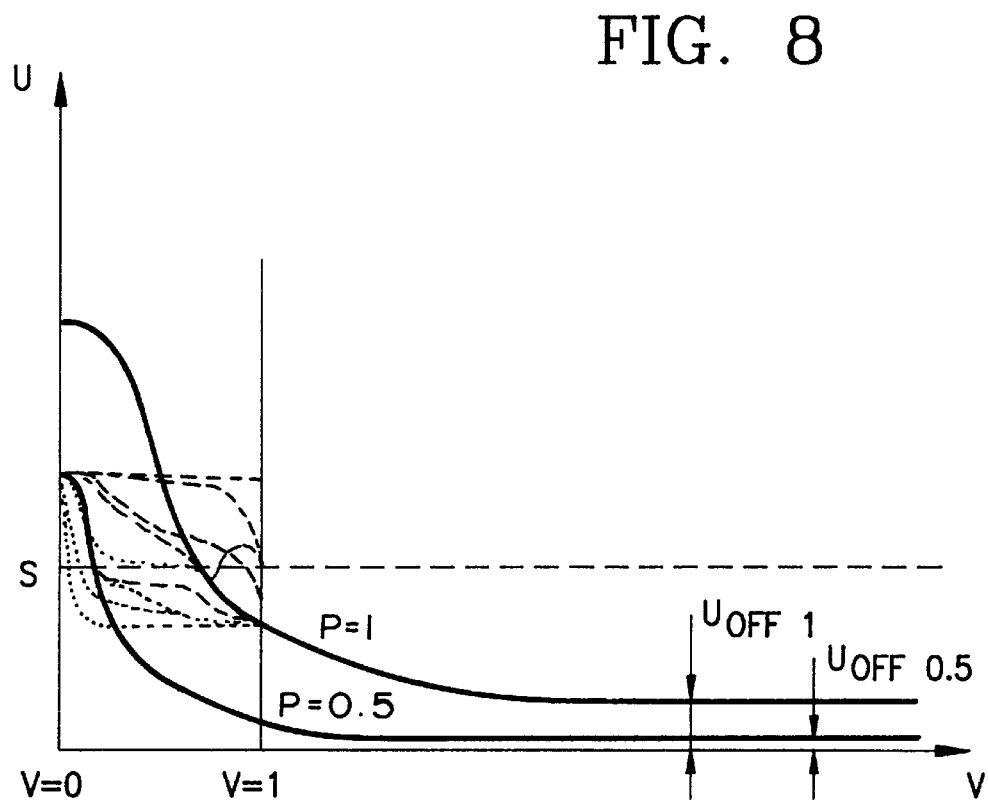
FIG. 8 shows the measurement signal as a function of the flow speed and the temperature of the heating element, and different transient responses of the measurement signal when switching the temperature of the heating element according to the process according to the invention.
Figure 10A:
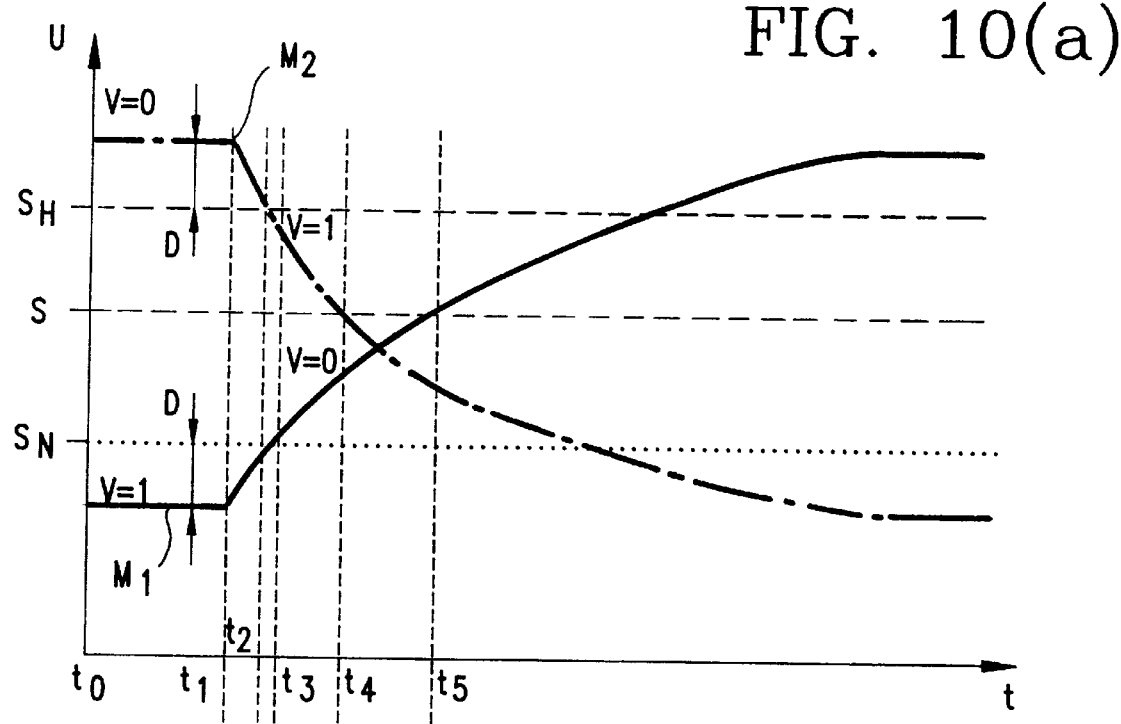
FIGS. 10a–d correspond to FIGS. 5a–d but are of a third embodiment of the process according to the invention and the output signal of a known process.
Figure 10B:
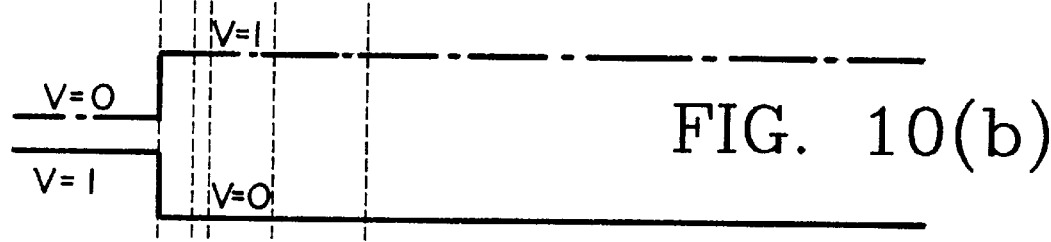
Figure 10C:
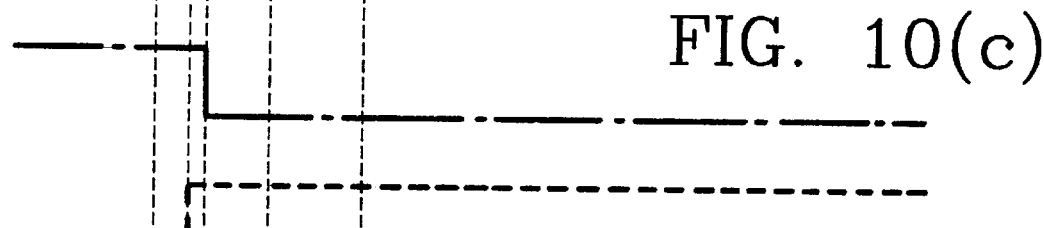
Figure 10D:
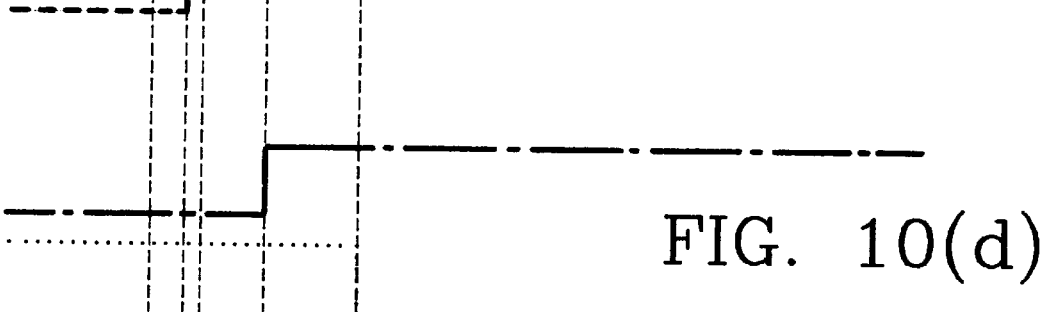

FIG. 8 shows, at this point, different transient behaviors between the two measurement signal behaviors for different heat outputs. The transient behaviors in the change from P=1 to P=0.5 are shown in FIG. 8 by very short dashes, while the transient behaviors in the change from P=0.5 to P=1 are shown by the broken line. The transient behaviors shown in FIG. 8 are influenced by the heat output control, by changes of the flow velocity of the flowing medium, by the change of the heat transfer resistances between the flowing medium and heating element or temperature measurement element, and by the fact that the nominal value of the heat output is not reached or exceeded. On the one hand, as shown in FIG. 6, this can lead to oscillation of the output signal, or on the other hand, as shown in some of the transient behaviors in FIG. 8, this can result in the output signal being switched back and forth several times before reaching a stable state.

This oscillation or temporary switching back and forth of the output signal can be prevented by controlling the change of the heat output depending on the temperature on the temperature measurement element.

FIG. 9, which corresponds essentially to FIG. 5, shows the behavior of a measurement signal M in FIG. 9a with the dot-dash line, for which different effects lead to irregular behavior of the measurement signal. In the measurement signal M shown in FIG. 9a by the dot-dash line, thus, unduly large variations of distance D of the measurement signal from switching point s occur. These variations can be prevented by controlling the heat output as a function of the temperature on the temperature measurement element.

When the heat output is controlled as a function of the temperature on the temperature measurement element, it must be ensured that the change of the heat output takes place only in one direction depending on the output signal. Only in this way can it be guaranteed that switching point s can again be exceeded.

Heat output is controlled as a function of the temperature on the temperature measurement element especially advantageously such that the change of the heat output ensures an essentially identical distance D between switching point s and the measurement signal. Thus, a permanently constant short reaction time to flow changes is guaranteed.

In order not to overload the heating element or in order that the temperature rise of the flowing medium by the heating element does not drop so far that a temperature change of the flowing medium is detected as a flow change, it is a good idea that the change of the heat output takes place within stipulated limits.

The strength of the relative change of the heat output of the heating element depends on how large the expected relative flow differences are. Here, it should be noted that, as the relative change of the heat output becomes less, the lower the expected relative flow differences. If this is not considered, the flow indicator, in turn, tends to natural resonance, i.e., the switching output periodically changes its state without a flow change. In particular, in applications of flow indicators in machine tools, i.e., in applications in which it is only determined whether a flow stoppage maximum flow exists, a value of 50% for the relative change of the heat output has proven advantageous.

Alternatively or cumulatively to the change of the heat output of the heating element, the process according to the invention is advantageously configured such that, for the case of a relatively high temperature on the temperature measurement element (output signal "flow stoppage"), the location of the switching point is changed to higher values ($S_H$) and for the case of a relatively low temperature on the temperature measurement element (output signal "flow present"), the location of the switching point is changed to lower values ($S_N$). Essentially, the same reduction of the reaction speed of the output signal to changes of the flow of the flowing medium is achieved by the described alternative configuration of the process according to the invention, as in the alternative of the change of the heat output described first.

The alternative implementation of the change of the location of the switching point is shown in FIG. 10, for a third embodiment of the process according to the invention. FIGS. 10b through 10d show, as in FIGS. 5 and 9, the behavior of the flow, the output signal of the third embodiment of a process according to the invention, and the output signal according to a known process. FIG. 10a shows how the change of the location of switching point S to $S_H$ or $S_N$ can occur, so that a clear increase of the reaction speed to a change of flow of the flowing medium is guaranteed.

Analogously to the first alternative of the change of the heat output, the second alternative is made advantageous by the fact that the change of the location of switching point S takes place with a stipulated delay after the change of the output signal. This ensures that the output signal does not tend to oscillation.

Alternatively or cumulatively to the delay of the change of location of the switching point the process according to the invention is characterized by the fact that the location of the switching point is essentially continuously changed to lower values and/or essentially continuously to higher values. The tendency of the output signal to oscillations is reduced by this measure, especially the ramp-shaped change of the switching point.

Optimum monitoring of the flow state in conjunction with a reduced tendency of the output signal to oscillations is ensured by the change of the location of switching point S being controlled as a function of the temperature on the temperature measurement element.

To guarantee in the control of the location of switching point S as a function of the temperature on the temperature measurement element that switching point S when the flow changes to flow values deviating from the flow values indicated by the output signal to guarantee [sic], the process according to the invention is characterized by the change of the position of switching point S taking place in only one direction as a function of the output signal.

In particular, the change of the location of switching point S (to $S_n$ or $S_H$) takes place advantageously by the fact that it ensures an essentially uniform distance D between the switching point and the measurement signal $M_1$, $M_2$, so that a reaction time which is always the same is guaranteed when the flow of the flowing medium changes.

For the same reasons as when the heat output changes, it is advantageous that the change of the location of switching point S takes place within stipulated limits.

As already addressed, it is possible and advantageous to cumulatively change the heat output of the heating element and the location of switching point S as a function of the output signal. It is advantageous to do this cumulatively, especially when a high nominal flow velocity is used, for which normally a correspondingly higher heat output is necessary. When the heat output is switched cumulatively and the location of switching point S is changed, it is also possible at high nominal flow velocities to select conventional heat outputs, such that an undesirable increase of the heat output can be prevented, and at the same time, the distance D between the measurement signal and switching point S does not become larger. It is also possible for a flow indicator which cumulatively switches the heat output, and also changes the location of the switching point S as a function of the output signal, to cover a much larger range of nominal flow velocities of the flowing medium to be monitored.

The process according to the invention is, furthermore, made advantageous by the fact that, at a distance between the measurement signal and switching point S which falls above or below a stipulated range of values, a fault signal— "unsafe range"—is delivered. This configuration of the process is advantageous both for statically operating flow indicators and also dynamically operating flow indicators, such that an overly small or overly large value for distance D between the measurement signal and switching point S is detected which is based on an internal or external fault, for example, an unsuitable heat output control curve or deviations from the stipulated time flow velocity changes, so that at the proper time countermeasures can be taken before a false output signal or oscillating output signal is produced. These ranges of values are shown by way of example in FIG. 5a. That is, in FIG. 5a, the upper range of values of "allowable" measurement signals is bordered by threshold switching point $s_o$ and $s_{o'}$ while the lower range of values is bounded by threshold switching points $s_u$ and $s_{u'}$.

The process according to the invention undergoes another advantageous embodiment by a fault signal—"unsafe range"—which does not exceed a stipulated length of time, not being delivered. In this way, especially in dynamically operating flow monitors, a continuous output of the fault signal is prevented when the switching point is exceeded or not reached.

We claim:

1. Process for monitoring the flow of a medium flowing past a temperature measurement element which is influenced by the medium flowing past the temperature measurement element and by heat output from at least one heating element in the flow, comprising the steps of monitoring a measurement signal of the temperature measurement element and generating an output signal which indicates a flow stopped condition when a temperature value of the measurement signal of the temperature measurement element passes a switching point value in a first direction and which indicates a flow present condition when the temperature value passes the switch point in a second direction, and changing at least one of the heat output of the heating element and the switching point value as a function of the output signal; wherein the heat output of the heating element is reduced during said changing step in response to the temperature value passing above the switching point value and producing a flow stoppage output signal; wherein the heat output of the heating element is increased during said changing step in response to the temperature value passing below the switching point value and producing a flow present output signal; wherein the switching point value is increased during said changing step in response to the temperature value passing above the switching point value and producing a flow stoppage output signal; and wherein the switching point value is decreased during said changing step in response to the temperature value passing below the switching point value and producing a flow present output signal.

2. Process according to claim 1, wherein said changing step is delayed a predetermined period of time after a change in the output signal before the heat output is changed.

3. Process according to claim 1, wherein the heat output is changed in an essentially continuous manner.

4. Process according to claim 1, wherein the heat output is changed in a ramp-type manner.

5. Process according to claim 1, wherein changing of the heat output is controlled as a function of the temperature value measured by the temperature measurement element.

6. Process according to claim 5, wherein the changing of the heat output takes place as a function of passing of the switching point value by the output signal in only one direction.

7. Process according to claim 5, wherein the changing of the heat output is performed in a manner producing an essentially uniform difference between the switching point value and the temperature value.

8. Process according to claim 1, wherein the heat output is changed within preset limits.

9. Process according to claim 8, wherein the preset limits for changing of the heat output are set as a function of expected flow changes in a manner decreasing heat output changes with decreases in expected flow changes.

10. Process according to claim 8, wherein changing of the heat output is limited to a 50% change.

11. Process according to claim 1, wherein said changing step is delayed a predetermined period of time after a change in the output signal before the switching point value is changed.

12. Process according to claim 1, wherein the switching point value is changed in an essentially continuous manner.

13. Process according to claim 1, wherein changing of the switching point is controlled as a function of the temperature value measured by the temperature measurement element.

14. Process according to claim 13, wherein the changing of the switching point value takes place as a function of passing of the switching point value by the output signal in only one direction.

15. Process according to claim 13, wherein the changing of the switching point value is performed in a manner producing an essentially uniform difference between the switching point value and the temperature value.

16. Process according to claim 1, wherein the switching point value is changed within preset limits.

17. Process according to claim 1, wherein an unsafe range fault signal is delivered when a difference between the temperature value and the switching point value falls outside of a preset range of values.

18. Process according to claim 17, wherein delivery of the unsafe range fault signal is prevented unless said difference lasts for at least a predetermined length of time.

* * * * *